United States Patent [19]

Yoshihara

[11] Patent Number: 5,231,276
[45] Date of Patent: Jul. 27, 1993

[54] SYSTEM FOR PREVENTING A FALSE USE OF A CARD TYPE RECORDING MEDIUM AND A METHOD THEREOF

[75] Inventor: Kenzou Yoshihara, Kounosu, Japan

[73] Assignee: Nippon Conlux Co., Ltd., Tokyo, Japan

[21] Appl. No.: 604,769

[22] Filed: Oct. 26, 1990

[51] Int. Cl.⁵ .............................................. G06K 7/10
[52] U.S. Cl. .................... 235/454; 235/468; 235/449; 360/2; 283/88; 283/904
[58] Field of Search .............. 235/454, 449, 440, 491, 235/493, 468, 469; 283/88, 91, 904; 360/2

[56] References Cited

U.S. PATENT DOCUMENTS

| | | | |
|---|---|---|---|
| 4,544,836 | 10/1985 | Galvin et al. | 283/904 |
| 4,605,846 | 8/1986 | Duret et al. | 235/468 |
| 4,641,017 | 2/1987 | Lopata | 235/454 |
| 4,678,898 | 7/1987 | Rudland | 235/468 |
| 4,694,148 | 9/1987 | Diekemper et al. | 235/468 |
| 4,710,617 | 12/1987 | Mouchotte | 235/487 |
| 4,711,996 | 12/1987 | Drexler | 235/487 |
| 4,790,566 | 12/1988 | Boissier et al. | 283/91 |
| 4,795,890 | 1/1989 | Goldman | 235/449 |
| 4,795,894 | 1/1989 | Sugimoto et al. | 235/468 |
| 4,853,525 | 8/1989 | Vogt et al. | 235/469 |
| 4,869,532 | 9/1989 | Abe et al. | 283/88 |

FOREIGN PATENT DOCUMENTS

| | | |
|---|---|---|
| 51-84695 | 7/1976 | Japan . |
| 52-45279 | 10/1977 | Japan . |
| 56-13341 | 3/1981 | Japan . |
| 58-171995 | 10/1983 | Japan . |
| 61-136188 | 6/1986 | Japan . |
| 62-4756 | 1/1987 | Japan . |
| 62-203290 | 9/1987 | Japan . |
| 63-263602 | 10/1988 | Japan . |
| 64-17774 | 1/1989 | Japan . |
| 64-21695 | 1/1989 | Japan . |
| 64-87395 | 3/1989 | Japan . |
| 1-23828 | 5/1989 | Japan . |

*Primary Examiner*—Eugene R. LaRoche
*Assistant Examiner*—Tan Nguyen
*Attorney, Agent, or Firm*—Graham & James

[57] ABSTRACT

This card type recording medium has plural types of inks which normally exhibit the same color visually but exhibit different optical characteristics under a predetermined condition provided in blocks in a desired pattern and, by breaking the blocks block by block in accordance with the used amount or other factor, is capable of recording information corresponding to the breakage state of the blocks. First information can be recorded by a pattern of arrangement of these plural types of inks and second information can be recorded in accordance with the breakage state of the blocks. The first information is a collation pattern which indicates that the card type recording medium is a genuine one. Since the plural types of inks exhibit the same color visually, it cannot be visually discerned which type of ink is used on which block, which makes it difficult to counterfeit the card by imitating this collation pattern. Besides, since the ink arrangement pattern cannot be visually discerned, it is difficult to repair punched holes of broken blocks by using the ink used in forming this ink arrangement pattern so that false alteration of the second information can be prevented.

4 Claims, 3 Drawing Sheets

SYSTEM FOR PREVENTING A FALSE USE OF A CARD TYPE RECORDING MEDIUM AND A METHOD THEREOF

BACKGROUND OF THE INVENTION

This invention relates to a card type recording medium applicable to various types of card type recording media including a prepaid card, an identification card, a bank card etc. and, more particularly, to a card type recording medium of a type in which desired information is recorded thereon by breaking blocks arranged on the card block by block. The invention further relates to a method of preventing a false use of such card type recording medium by counterfeiting of a card or false restoration of a broken block on a card.

Known in the art are various methods and apparatuses for detecting a surface design pattern of a bank note, bill, bond or the like in an optical way. Japanese Patent Publication No. 1-23828, for example, discloses optical validation of a bank note or the like by utilizing difference in absorption (or transmittance) to a visible ray and infrared ray between a magnetic ink and a color ink. Japanese Patent Application Laid-open No. 51-84695 discloses also an optical type validation apparatus for a bank note or the like based on a similar principle.

Known also in the art is a technique of utilizing an invisible light such as infrared ray for reading of information or card identification in a card type recording medium such as a prepaid card. Japanese Patent Publication No. 62-4756, for example, discloses a technique according to which, in a case where proper data such as the name of the owner is recorded by punching in an ID card or a credit card, false holes are formed with true data holes in the card, these holes are filled with a pattern representing desired proper data by using an infrared ray transmitting element and an infrared ray non-transmitting element, and the proper data is read by irradiating infrared ray. The Japanese Patent Publication No. 56-13341 discloses a technique according to which a bar code pattern is printed with ink which reacts to invisible light, which bar code pattern cannot be recognized in appearance by visible light. Japanese Utility Model Publication No. 52-45279 discloses putting a signature on a collation card used for depositing of money in a bank or the like purpose is made with an invisible light ink. Japanese Patent Application Laid-open No. 64-87395 discloses providing an infrared ray reacting pattern on a magnetic recording layer of a card type recording medium for discriminating a true card from a false one. Japanese Patent Application Laid-open No. 58-171995 discloses printing a bar code pattern with ink which reacts to infrared ray on a bar code recorded pari-mutuel ticket so as to prevent recognition of the pattern by visible light in appearance. Japanese Patent Application Laid-open No. 61-136188 discloses a technique according to which a magnetic card includes an invisible light identifying recording section in addition to a magnetic recording section, and data concerning variable and security data are recorded in the magnetic recording section whereas data proper to the card is recorded in the invisible light identifying recording section.

In a card type recording medium such as a prepaid card, it has been known also to perform punching in a predetermined region in the card in accordance with the used amount thereby to visibly display the used amount i.e., the remaining amount available for future use, of the card. Japanese Patent Application Laid-open No. 63-263602, for example, discloses provision of a punched recording section in addition to a magnetic recording section in a magnetic card such as a prepaid card an recording of the state of use by punching as well as by magnetic recording. Japanese Patent Application Laid-open No. 62-203290 discloses forming a punched recording section with a magnetic recording medium in a prepaid card and coping with a false alteration such as closing holes punched in the card with a tape or the like by detecting holes not optically but magnetically. Japanese Patent Application Laid-open No. 64-21695 discloses a technique according to which a punched recording section is formed with a magnetic recording medium in a prepaid card, information concerning use of the card is previously recorded magnetically and the used amount, i.e., the remaining amount for use, can be visually confirmed and magnetically read by breaking of blocks of the magnetic recording medium. Japanese Utility Model Application Laid-open No. 64-17774 discloses forming a punched recording section with a fluorescent material.

As to the card type recording media in which information is recorded by breaking means such as punching among the above described prior art card type recording media, possibility of a false use of the card by falsely altering information contained in the card by filling holes punched in the card with a tape or coating has become a serious problem. For coping with this problem of false use of the card, the above described Japanese Utility Model Application Laid-open No. 64-17774 discloses forming the punched recording section with a fluorescent material. This technique however still has the problem that a false use cannot be detected when the false user has filled holes punched in the card with a fluorescent coating of the same quality. The same problem remains unsettled with respect to the other prior art techniques utilizing invisible light such as infrared ray for reading of proper information in the card type recording medium.

Further, the prior art cards in which information is recorded by breaking means such as punching, only one type of information relying on presence or absence of a hole punched in the card can be recorded and, therefore, the amount of recordable information is limited. Besides, guard against counterfeiting of the card per se is insufficient.

SUMMARY OF THE INVENTION

It is, therefore, an object of the invention to provide a card type recording medium of a type in which desired information is recorded by breaking blocks arranged on the card block by block and which is capable of increasing the amount of recordable information by enabling two types of information to be recorded on the same card.

It is another object of the invention to provide a card type recording medium capable of effectively preventing a false use of the card such as counterfeiting of the card or false alteration of a broken block by enabling such two types of information to be recorded.

It is still another object of the invention to provide a method of preventing such false use of a card type recording medium.

The card type recording medium according to the invention is characterized in that it has plural types of ink which normally exhibit the same color visually but exhibit different optical characteristics under a predetermined condition provided in blocks in a desired pattern and, by breaking the blocks of ink block by block, is capable of recording information corresponding to the breakage state of the blocks.

It is an important feature of the invention that, in a card type recording medium having plural types of inks which normally exhibit the same color visually but exhibit different optical characteristics under a predetermined condition provided in blocks in a desired pattern, first information can be recorded by the pattern of plural types of inks and, further, second information corresponding to the breakage state of the blocks can be recorded by breaking the plural blocks block by block.

As an example of such ink, plural types of inks which are visually of the same color at normal temperature but exhibit different optical characteristics to light of an invisible wavelength region. For example, ink which reacts to infrared ray and ink which does not are used in combination. For another example, ink which changes color with variation of temperature may be used.

For preventing a false use by counterfeiting of a card, it is preferable that the arranged pattern of the plural types of inks should be a collation pattern for verifying that the card type recording medium is a true recording medium. Since the plural types of inks are of the same color visually, what type of ink is used in a particular block cannot be visually discerned, so that it is difficult to counterfeit a card by imitating the ink arrangement pattern of the true card.

As regards false alteration of information corresponding to the breakage state of a block, since the plural types of inks are of the same color visually, what type of ink is used in a particular block cannot be visually discerned, so that it is difficult to repair a broken block by using the ink used in the ink arrangement pattern (e.g., filling the broken block with this ink) and, as a result, a false use of the card can be prevented. The information recorded by the breaking of the block may, for example, be information concerning variable representing state of use of the card type recording medium. Depending upon the purpose of use, this information may also be proper information representing, for example, the name of user of the card type recording medium.

A method of preventing a false use of a card type recording medium according to the invention comprises executing, when the card type recording medium has been inserted, a first step of irradiating a beam of light on each block under the predetermined condition and receiving its reflected or transmitted light thereby to obtain a detection signal responsive to the characteristic of each of the blocks, a second step of preparing a reference level corresponding to presence or absence of the breakage of blocks for each of the plural types of inks and comparing the reference level with the detection signal, and a third step of detecting, on the basis of result of the comparison made in the second step, the type of ink provided in the block and presence or absence of breakage of the block and collating whether or not the detected ink type pattern of the block coincides with the predetermined pattern, and prohibits use of a card type recording medium for which a result of collation indicating coincidence of the detected ink pattern with the predetermined pattern in the third step has not been produced.

According to the method of preventing a false use of the card type recording medium of the invention, in the first step, a detection signal corresponding to the characteristic of each block is obtained by irradiating a beam of light under the predetermined condition (e.g., a beam of light of a predetermined invisible wavelength region) and receiving its reflected or transmitted light. In the second step, a reference level corresponding to presence or absence of the breakage of block for each of the plural types of inks is prepared and this reference level is compared with the detection signal.

Assuming, for example, that there are two types of inks A and B, a reference level Vrefa for absence of breakage concerning the ink A, a reference level Vrefa1 for presence of breakage concerning the ink A, a reference level Vrefb for absence of breakage concerning the ink B and a reference level Vrefb1 for presence of breakage concerning the ink B are respectively prepared. Since the optical characteristics of the respective inks are different under the predetermined condition, the reference levels Vrefa and Vrefb during absence of breakage differ between the inks. Further, since the remaining amount of ink in the particular blocks of the respective inks differs with presence and absence of breakage, the reference levels Vrefa, Vrefa1, Vrefb and Vrefb1 differ one from another. Accordingly, by comparing these reference levels with the detection signal, the type of ink provided in each of the particular block and presence or absence of breakage of the block can be detected.

In the third step, the type of ink provided in the block and presence and absence of breakage of the block are detected on the basis of result of the comparison made in the second step and collation is made to detect whether or not the detected ink type pattern of the block coincides with the predetermined pattern. In other words, the type of ink provided in the block is detected by detecting whether or not the level of the detection signal from this block satisfies the condition of the reference level during presence or absence of breakage of the predetermined ink provided in the block, and collation is made to find whether or not the thus detected ink type pattern coincides with the predetermined pattern. Presence or absence of breakage can be found by determining which of the conditions of the reference levels during presence and absence of breakage of the predetermined ink has been satisfied.

When a result of collation indicating coincidence of the detected ink pattern with the predetermined pattern in the third step has not been obtained, use of the card type recording medium is prohibited, because in this case some false alteration is considered to have been made in the card type recording medium.

In one aspect of the invention, a method of preventing a false use of a card type recording medium further comprises, providing a recording area of a magnetic recording medium in the above described card type recording medium and executing, upon insertion of the card, a first step of breaking the blocks block by block in accordance with use of the card and recording information representing use of the card in response to the state of breakage of the block and also magnetically recording the information representing use of the card in the recording area of the magnetic recording medium, a second step of reading the state of use recorded in the recording area consisting of the magnetic recording medium, a third step of irradiating a beam of light on the respective blocks under the predetermined condition and receiving its reflected or transmitted light thereby to obtain a detection signal corresponding to the characteristic of each of the blocks, a fourth step of preparing a reference level corresponding to presence or absence of breakage of block for each of the plural types of inks and comparing the reference level with the detection signal, a fifth step of detecting, on the basis of result of comparison made in the fourth step, the type of ink provided in the block and presence or absence of breakage of the block, collating whether or not the detected ink type pattern of the block coincides with the predetermined pattern, and obtaining information indicating the state of use of the card in response to the broken state of the block, and a sixth step of allowing use of the card when a result of collation indicating coincidence of the detected ink pattern with the predetermined pattern in the fifth step has been produced and also coincidence between the information indicating the state of use obtained in the second step and the information indicating the state of use obtained in the fifth step has been produced.

According to the method of preventing a false use of a card type recording medium, in the first step, information representing use of the card is recorded magnetically in the recording area of the magnetic recording medium in the card type recording medium and also be breakage of a block in the arrangement of the plural blocks. In the second step, the information representing the state of use recorded in the recording area of the magnetic recording area is read and, in the third step, an optical detection of the arrangement of the plural blocks is made and a detection signal corresponding to the characteristic of each of the blocks thereby is obtained.

In the fourth and fifth steps, in the same manner as described before, collation is made to detect whether or not the ink type pattern of each block coincides with the predetermined pattern on the basis of a result of comparison of each reference level with the detection signal and presence or absence of breakage of each block is detected and information indicating the state of use of the card is obtained in response to the breakage state of the block.

Finally in the sixth step, when a result of collation indicating coincidence of the detected ink pattern with the predetermined pattern in the fifth step has been produced and also coincidence between the information indicating the state of use obtained in the second step (information recorded magnetically) and the information indicating the state of use obtained in the fifth step (information obtained by breakage of the blocks block by block) has been produced, use of the card is allowed.

This method presupposes use of a card of a type such as a prepaid card in which the used amount of the card, i.e., the remaining amount available for use of the card, is recorded and allows use of the card when not only coincidence of the ink pattern with the predetermined pattern but also coincidence between the two types of information of the state of use obtained by the two different recording methods have been produced whereby prevention of a false use of the card can be further ensured.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1:
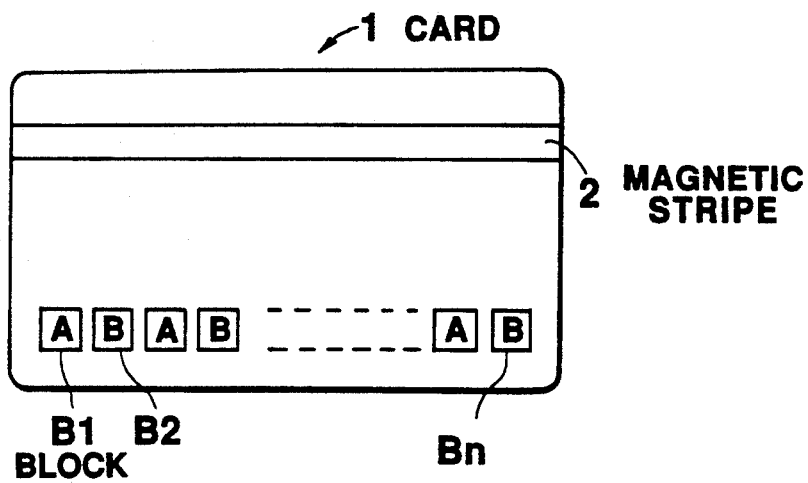
FIG. 1 is a plan view of a card type recording medium according to the invention.

FIG. 1 is a plan view of an example of the card type recording medium according to the invention. A card 1 has plural types of ink which normally exhibit the same color visually but exhibit different optical characteristics to light of an invisible wavelength region provided in blocks B1 to Bn in a desired pattern and, by breaking the blocks of ink block by block, is capable of recording information corresponding to the breakage state of the blocks. For example, there are two types of inks A and B. The ink A has a small rate of reflection and the ink B has a large rate of reflection to infrared ray. Since the two types of inks A and B are of the same color visually, they cannot be distinguished from each other visually. In the figure, reference characters A and B are affixed in the blocks to illustrate the ink arrangement pattern. For convenience of explanation, the ink arrangement pattern is described as the blocks A and B being arranged alternately but the arrangement of the blocks A and B is of course not limited to the illustrated pattern.

In this example, this ink arrangement pattern is utilized as a collation pattern for verifying that the card 1 is genuine. The ink arrangement pattern however is not limited to this example but, depending upon the purpose of use of the card, information proper to each card (e.g., information concerning the user) may be expressed by this ink arrangement pattern.

In this example, it is assumed that this card 1 is a prepaid card and the information recorded in accordance with the breakage state of the blocks B1 to Bn by breaking the blocks B1 to Bn block by block is information concerning variable (hereinafter referred to as "variable information") such as information representing the state of use of the card 1. The information however is not limited to this but it may be information proper to each card (e.g., information concerning the user). Breaking of the blocks B1 to Bn can be effected by punching required blocks in the known manner.

In this example, the card 1 further has a recording area consisting of a magnetic recording medium, i.e., a magnetic stripe 2. In this magnetic stripe 2, variable information representing the state of use is recorded and other suitable information such as information proper to each card (e.g., information concerning the user) may be recorded in the known manner.

Figure 2:
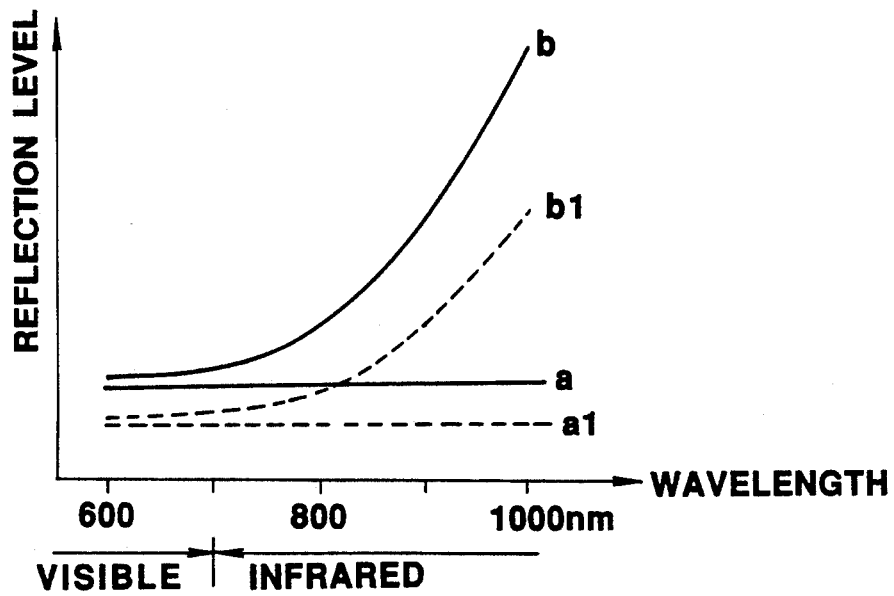
FIG. 2 is a graph showing an example of reflection characteristics of two types of inks A and B used in the card of FIG. 1.

FIG. 2 shows an example of reflection characteristics of the inks A and B. In the figure, solid lines a and b indicate reflection levels of blocks corresponding to the inks A and B available when the blocks are not punched and dotted lines a1 and b1 indicate reflection levels of blocks corresponding to the inks A and B available when the blocks are punched. It will be noted that the two reflection levels do not exhibit much difference to visible light but they exhibit much difference to infrared ray.

Figure 3:
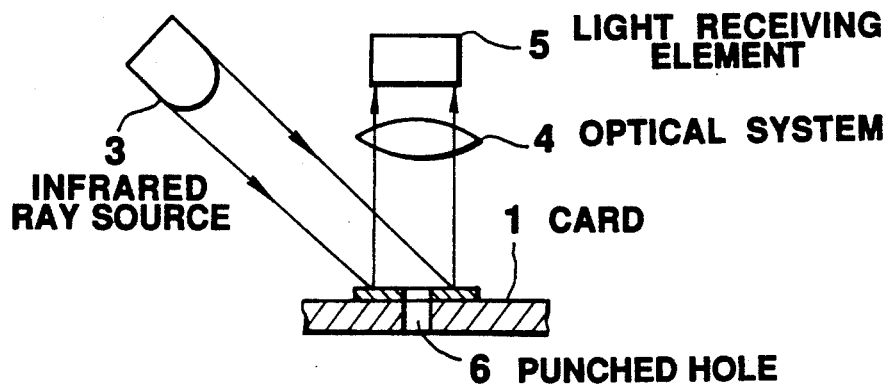
FIG. 3 is a side view schematically showing an example of an optical type detection system for irradiating infrared ray on an arrangement of blocks in the card of FIG. 1 to receive its reflected light and thereby detecting the level of the received light.

FIG. 3 is a side view schematically showing an example of an optical type detection system which receives reflected light when infrared ray has been irradiated on the blocks B1 to Bn in the card 1 and thereby detects the level of the received light. A beam of infrared ray is irradiated from an infrared ray source 3 on the blocks B1 to Bn in the card 1 and its diffused reflection is focused by an optical system 4 and received by a light receiving element 5 and converted to an electric signal. In this case, the amount of reflection of infrared ray is larger in the blocks of the ink B than in the blocks of the ink A, as shown in FIG. 2. In the case where a punched hole 6 is formed in the card 1, the amount of diffused reflection received by the light receiving element 5 is reduced and the level of received light is thereby reduced. The illustrated optical type detection system generally is fixed and the inserted card 1 itself is moved for effecting sequential scanning of the blocks B1 to Bn to sequentially detect characteristics of these blocks B1 to Bn. This optical type detection system per se is known so that detailed description thereof will be omitted.

Figure 4:
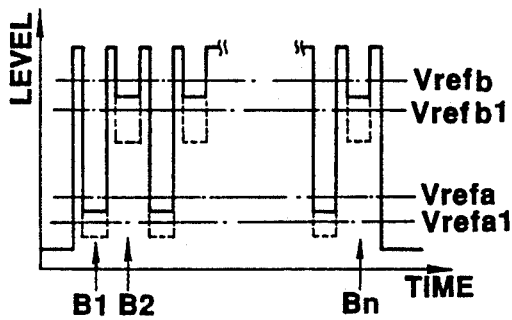
FIG. 4 is a graph showing a typical example of a detection signal obtained from the arrangement of blocks of the card of FIG. 1 by the detection system of FIG. 3.

FIG. 4 shows a typical example of detection signals obtained from the blocks B1 to Bn. In the figure, the coordinate represents the level of the detection signals and the abscissa represents time and the blocks B1 to Bn are sequentially scanned in this order. In this case, is assumed that the two types of inks A and B are arranged alternately as described before. In this example, there is no ink A or B at the border of adjacent blocks and a smooth surface of the card 1 is exposed. Accordingly, the level of reflected light from the border of the adjacent blocks becomes maximum but this level is irrelevant to the required detection. The solid lines indicate that the block is not broken (i.e., the block is not punched) and the dotted lines indicate that the block is broken (i.e., the block is punched). As will be apparent from the characteristics of FIG. 2, the magnitudes of the reflected lights are in the order that the level of reflected light from the block corresponding to the ink B which is not punched is the largest, the reflected light from the block corresponding to the ink B which is punched is the smallest, the reflected light from the block corresponding to the ink A which is not punched is the third and the reflected light from the block corresponding to the ink A which is punched is the fourth.

As described in the foregoing, the level of reflected light corresponding to presence or absence of breakage of a block differs depending upon the type of ink. Therefore, by preparing reference levels Vrefa, Vrefa1, Vrefb and Vrefb1 corresponding to presence and absence of breakage for each type of ink and comparing these reference levels with the detection signal obtained by the light receiving element 5, collation of the arrangement patterns of the inks A and B and detection of presence or absence of a punched hole can be achieved.

For example, Vrefa represents the reference level for absence of breakage concerning the ink A, Vrefa1 the reference level for presence of breakage concerning the ink A, Vrefb the reference level for absence of breakage concerning the ink B and Vrefb1 the reference level for presence of breakage concerning the ink B and there is relation Vrefb > Vrefb1 > Vrefa > Vrefa1. The detection is made on the standard that: when the level RL of the detection signal is Vrefb > RL > Vrefb1, the detection signal represents the ink B in the absence of breakage; when the level RL is Vrefb1 > RL > Vrefa, the detection signal represents the ink B in the presence of breakage; when the level RL is Vrefa > RL > Vrefa1, the detection signal represents the ink A in the absence of breakage; and when the level RL is Vrefa1 > RL, the detection signal represents the ink A in the presence of breakage. The standard of detection however is not limited to this but it may be suitably determined.

By determining the standard of detection suitably, the type of ink provided in each block and presence or absence of breakage of the block can be detected on the basis of a result of comparison. By collating whether or not the detected pattern of the types of inks provided in the respective blocks coincides with the predetermined ink arrangement pattern, validation of the inserted card 1 can be realized.

Figure 5:
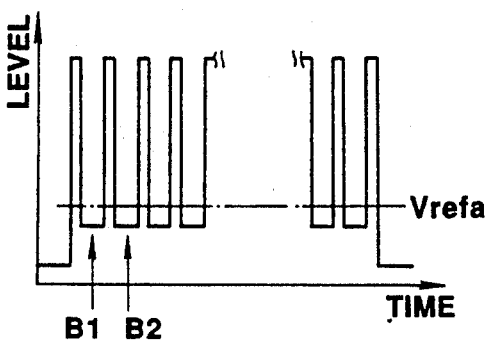
FIGS. 5 to 8 are graphs showing examples of detection signals obtained in a case where the arrangement of blocks in the card of FIG. 1 has been counterfeited or falsely altered.

In a case, for example, where a card has been counterfeited by coating blocks B1 to Bn with substantially the same ink as the ink A, levels of detection signals from respective blocks in the absence of breakage become as shown in FIG. 5. The levels RL of detection signals of all blocks become Vrefa > RL > Vrefa1 whereby it is readily detected that the ink A is provided in all blocks B1 to Bn. It is therefore readily found that the detected pattern does not coincide with the predetermined ink arrangement pattern and, in this case, the inserted card 1 is returned as a counterfeited card and its use is prohibited.

Figure 6:
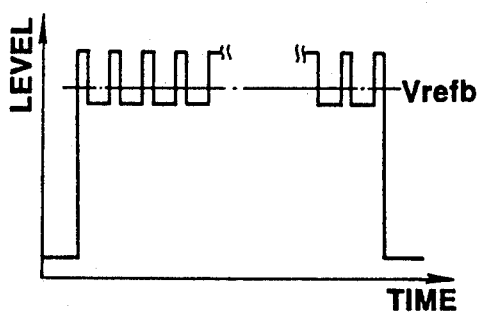

For another example, in a case where a card has been counterfeited by coating blocks B1 to Bn with ink which is substantially the same as the ink B, levels of detection signals from the respective blocks in the absence of breakage become as shown in FIG. 6. In this case, the levels RL of all detection signals become Vrefb > RL > Vrefb1 and, therefore, it is readily detected that the ink B is provided in all blocks B1 to Bn. It is readily found that the detected pattern does not coincide with the predetermined ink arrangement pattern and the inserted card 1 is returned as a counterfeit card and its use is prohibited.

Next, description will be made about a case where a card 1 having some blocks punched in accordance to use of the card has been falsely altered by filling the punched holes with ink.

Figure 7:
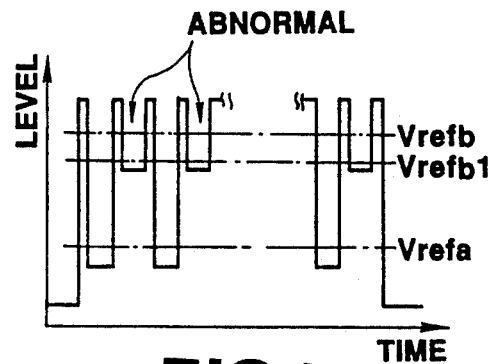

Assume, for example, that all punched blocks have been filled with the ink A. In this case, levels of detection signals of the respective blocks become as shown in FIG. 7. The blocks which were originally provided with the ink A are detected as blocks without punched holes but the blocks which were originally provided with the ink B are not detected as normal blocks with punched holes or without punched holes so that abnormality is detected. This abnormality can be detected because, when the punched hole of the block in which the ink B was originally provided has been filled with the ink A, the level of reflected light which is the same as when the entire surface of the block is provided with the ink B cannot be obtained but the level of reflected light becomes lower than that.

In the case of FIG. 7, when the punched hole in the block which was originally provided with the ink B is filled with the ink A, the level RL of the reflected light detection signal is not Vrefb>RL>Vrefb1 but Vrefb1>RL>Vrefa. Accordingly, this block is not detected as a block provided with the ink B having no punched hole but is detected as a block having a punched hole, so that the false alteration of the card is not successful. In the illustrated example, the false alteration of punched holes can be detected but whether the ink arrangement pattern is true or false cannot be detected since the ink arrangement pattern in this case becomes the same pattern as when a block provided with the ink B has been punched. It is however possible to detect not only a false repair of a punched hole but also a false ink arrangement pattern by suitably determining the standard level of detection. Besides, it is usually difficult to coat ink strictly on the portion of a punched hole only and ink is actually coated on a portion surrounding the punched hole. In this case, as shown in FIG. 5, the entire levels fall so that the ink arrangement pattern can be accurately detected. Normally, false alteration of use state information record data by punched holes is made together with false alteration of use state information record data in the magnetic stripe 2. In that case, false alteration of the record by breaking of blocks cannot be successfully achieved as described above, even if the false alteration of magnetically recorded data is made successfully. Therefore, by collating whether there is coincidence between the two recorded data, non-coincidence can be detected. The card in which this non-coincidence has occurred therefore is returned and its use is prohibited.

Figure 8:
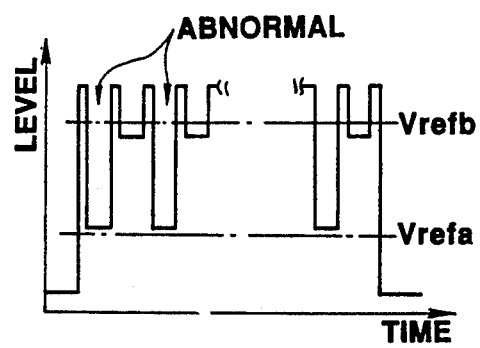

Assume again, for example, that all punched blocks have been filled with the ink B. In this case, levels of detection signals of the respective blocks become as shown in FIG. 8. The blocks which were originally provided with the ink B are detected as blocks without punched holes but the blocks which were originally provided with the ink A are not detected as normal blocks with punched holes or without punched holes so that abnormality is detected. This abnormality can be detected because, when the punched hole of the block in which the ink A was originally provided has been filled with the ink B, the level of reflected light which is the same as when the entire surface of the block is provided with the ink A cannot be obtained but the level of reflected light becomes higher than that.

In the case of FIG. 8, when the punched hole in the block which was originally provided with the ink A is filled with the ink B, the level RL of the reflected light detection signal is not Vrefa>RL>Vrefa1 but Vrefb1>RL>Vrefa. Accordingly, this block is not detected as a block provided with the ink A having no punched hole but is detected as a block having a punched hole, so that the false alteration of the card is not successful. Accordingly, false alteration of the recorded data can be detected and the card is returned and its use is prohibited.

Summing up, on the basis of reading of information from the blocks B1 to Bn for recording by punching, validation of the card 1 can be made in the following steps.

Respective reference levels Vrefa, Vrefa1, Vrefb and Vrefb1 are compared with the reflected light detection signal.

Then, on the basis of a result of this comparison, the type of ink provided in the blocks B1 to Bn and presence or absence of breakage of these blocks are detected and the detected ink type pattern of each block is collated with the predetermined pattern to detect coincidence therebetween.

As a result of this collation, a card 1 from which a result of collation that the detected pattern coincides with the predetermined pattern has not been obtained is prohibited from use whereby a false use of a counterfeit card can be prevented.

In a case where use state information is recorded not only by the blocks B1 to Bn for recording by punching but also by the magnetic stripe 2, false alteration of the card 1 can be detected in the following manner.

Reference levels Vrefa, Vrefa1, Vrefb and Vrefb1 are compared with the reflected light level detection signal.

Then, on the basis of a result of comparison, the type of ink provided in blocks B1 to Bn and presence or absence of breakage are detected. The ink type pattern of the detected block is collated with the predetermined pattern to detect coincidence therebetween and information representing the state of use is obtained in accordance with the breakage state of the block.

When a result of collation that the detected pattern coincides with the predetermined pattern has been obtained and coincidence between the information representing the state of use obtained in accordance with the breakage state of the block and the information representing the state of use recorded magnetically has been produced, use of the card 1 is allowed. Otherwise, existence of false alteration is assumed and use of the card 1 is prohibited.

Figure 9:
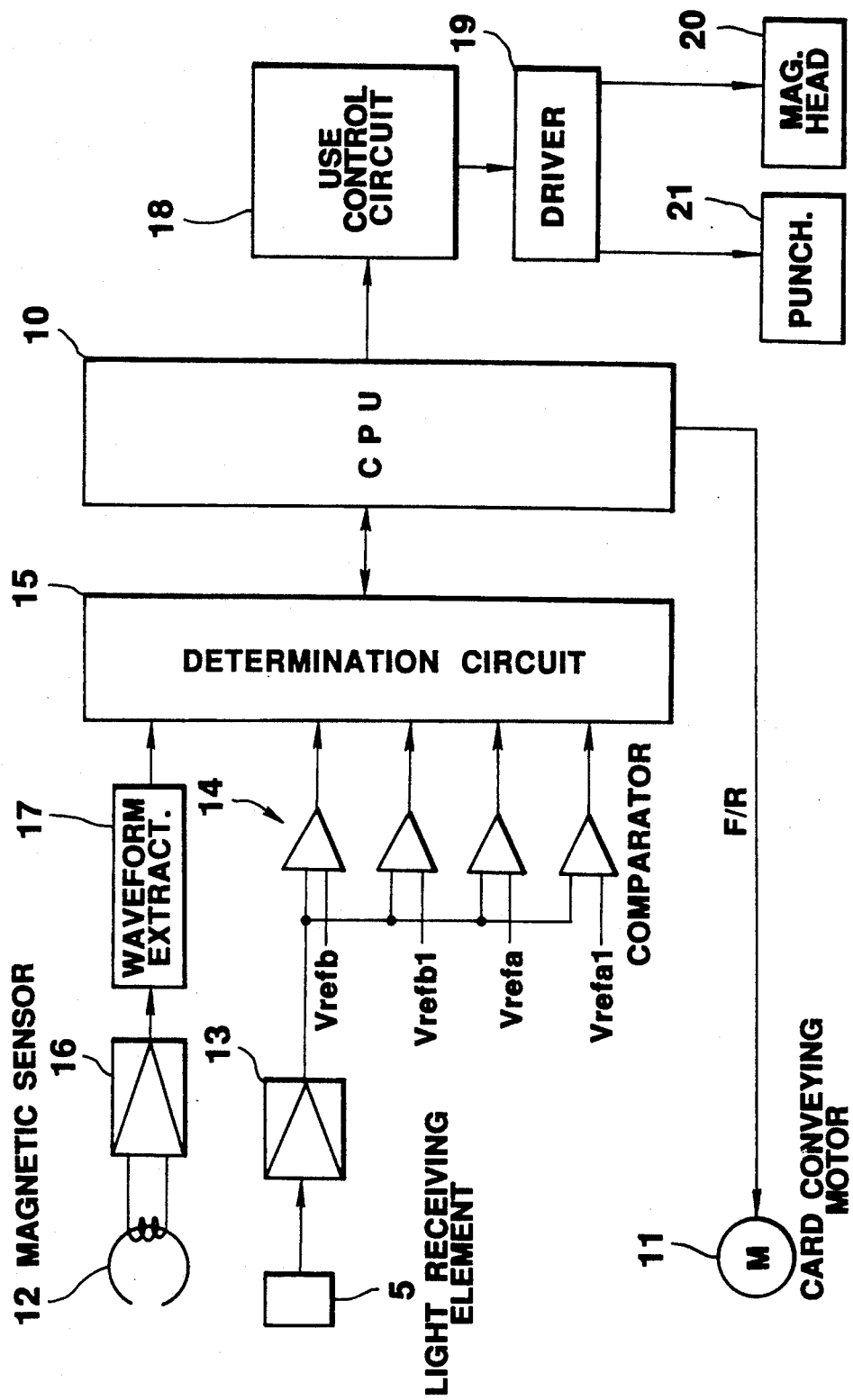
FIG. 9 is a block diagram showing schematically an example of a card information read/write system used in carrying out the invention.

FIG. 9 shows schematically an example of the card information read/write system used in carrying out the invention.

Upon insertion of a card 1, a card conveying motor 11 is rotated forwardly by the control by a CPU 10 and the card 1 thereby is fed inwardly. In this process, information recorded on the card 1 is read by the optical type detection system shown in FIG. 3 and a magnetic sensor 12. The reflected light level detection signal provided from a light receiving element 5 is applied to comparators 14 through an amplifier 13 and compared with reference levels Vrefa, Vrefa1, Vrefb and Vrefb1. Results of comparison are applied to a determination circuit 15. On the other hand, the magnetic sensor 12 reads recorded information in the magnetic stripe 2 of the card 1. The read magnetic recorded information is supplied to the determination circuit 15 through an amplifier 16 and a waveform extracting circuit 17.

The determination circuit 15 has reference data of the ink arrangement pattern in the blocks B1 to Bn and detects the ink arrangement pattern of the inserted card 1 on the basis of results of comparison from the comparators 14 to detect whether or not the detected ink arrangement pattern coincides with the reference ink arrangement pattern. Depending upon whether the ink arrangement pattern is genuine or not, a control signal is supplied from the CPU 10 to the card conveying motor 11. If the ink arrangement pattern is false, the motor 11 is rotated reversely to return the card 1 to prohibit its use.

The determination circuit 15 detects also presence or absence of breakage of the blocks B1 to Bn on the basis of results of comparison from the comparators 14 and the reference data of ink arrangement pattern of the blocks B1 to Bn and thereby obtains information representing the state of use corresponding to the breakage state of the blocks. The determination circuit 15 also reads the information representing the state of use recorded in the magnetic stripe 2 and other information on the basis of output of the waveform extracting circuit 17. The determination circuit 15 then collates whether there is coincidence between the information representing the state of use recorded in the magnetic stripe 2 and the information representing the state of use based on the breakage state of the blocks. If there is no coincidence between the two information representing the state of use, false alteration is assumed to exist in the card 1 and a control signal is supplied from the CPU 10 to the card conveying motor 11 to rotate the motor 11 reversely. The card 1 is thereby returned and its use is prohibited.

If the ink arrangement pattern has been detected to be genuine and coincidence between the two information representing the state of use has been detected, the motor 11 continues its forward rotation until the card 1 has reached a predetermined card retention position, the card 1 is temporarily retained at this retention position and then use of the card 1 is allowed.

A card use allowing signal is supplied with information representing the remaining amount and other information to a use control circuit 18. In response to these information, the use control circuit 18 starts predetermined operations such as vending. Upon completion of the predetermined operations such as vending, a signal is supplied to a magnetic head 20 and a punching device 21 to rewrite the use state information in the magnetic stripe 2 and, when necessary, punch required blocks.

In the above described embodiment, a detection system utilizing reflected light is adopted. Alternatively, a detection system utilizing transmitted light may be adopted.

The place on which the ink is disposed is not limited to the surface of the card but it may be in the middle layer of the card 1. In this case, the detection system becomes one utilizing transmitted light.

As the plural types of inks which are of the same color visually in a normal state but exhibit different optical characteristics, not only those used in the above described embodiment which exhibit different characteristics to light of an invisible wavelength region but plural types of inks which change their color with temperature (i.e., temperature exhibiting coating) may be used. For example, ink which is of the same color visually at room temperature but changes its color at a predetermined high (or low) temperature is used as the ink B and ink which does not change its color with temperature is used as the ink A. A heating device (or a cooling device) is attached to the device reading information on the card so that heating (or cooling) will be made in detecting presence or absence of blocks.

As described in the foregoing, according to the invention, plural types of inks which cannot be distinguished from each other visually in a normal state are provided in a desired pattern on a card type recording medium and, since this pattern cannot be visually discriminated, a false use of the card by counterfeiting or false alteration of recorded data can be effectively prevented. Besides, since two types of information can be recorded by the invisible ink arrangement pattern in the block arrangement and by breaking of the blocks block by block, the amount of recordable information can be increased.

What is claimed is:

1. A method of preventing a false use of a card type recording medium which has plural types of inks that normally exhibit the same color visually but exhibit different optical characteristics under a predetermined condition, the plural types of inks provided in blocks in a predetermined pattern, wherein each of the blocks is capable of being broken to form an aperture therein and the breakage state of the blocks represents recorded information, said method comprising executing:

a first step of irradiating a beam of light on each block under the predetermined condition and receiving its reflected or transmitted light thereby to obtain a detection signal responsive to the characteristic of each of the blocks;

a second step of preparing first reference levels for the plural types of ink, each said first reference level corresponding to absence of the breakage of the block of the associated type of ink, preparing second reference levels for the plural types of inks, each said second reference level corresponding to presence of the breakage of the block of the associated type of ink, and comparing the first and second reference levels with the detection signal; and a third step of detecting, on the basis of result of the comparison made in the second step, the type of ink provided in the block and presence or absence of the breakage of the block, collating whether or not the detected ink type pattern of the block coincides with the predetermined pattern, and obtaining said recorded information in response to the breakage state; and prohibiting use of a card type recording medium for which a result of collation indicating coincidence of the detected ink pattern with the predetermined pattern in the third step has not been produced.

2. A method of preventing a false use of a card type recording medium which has plural types of inks that normally exhibit the same color visually but exhibit different optical characteristics under a predetermined condition provided in blocks in a predetermined pattern and also has a recording area made of a magnetic recording medium, said method comprising:

a first step of breaking the blocks block by block in accordance with use of the card to thereby record information representing use of the card in response to the state of breakage of the block and also magnetically recording the information representing use of the card in the recording area of the magnetic recording medium;

a. second step of reading the state of use recorded in the recording area of the magnetic recording medium;

a third step of irradiating a beam of light on the respective blocks under the predetermined condition and receiving its reflected or transmitted light thereby to obtain a detection signal corresponding to the characteristic of each of the blocks;

a fourth step of preparing first reference levels for the plural types of inks, each said first reference level corresponding to absence of the breakage of the block of the associated type of ink, preparing second reference levels for the plural types of inks, each said second reference level corresponding to presence of the breakage of the block of the associated type of ink, and comparing the first and second reference levels with the detection signal;

a fifth step of detecting, on the basis of result of comparison made in the fourth step, the type of ink provided in the block and presence or absence of breakage of the block, collating whether or not the detected ink type pattern of the block coincides with the predetermined pattern, and obtained information indicating the state of use of the card in response to the breakage state of the block; and a sixth step of allowing use of the card when a result of the collation indicating coincidence of the detected ink pattern with the predetermined pattern in the fifth step has been produced and also coincidence between the information indicating the state of use obtained in the second step and the information indicating the state of use obtained in the fifth step has been produced.

3. A system for preventing a false use of a card type recording medium which has a first and a second type of ink that normally exhibit the same color visually but exhibit different optical characteristics under a predetermined condition, the first and second type of ink being provided in blocks in a predetermined pattern to represent first information, wherein each of the blocks is capable of being broken to form an aperture therein and the breakage state of the blocks represents second information, the system comprising:

an optical reader having a single pick-up, the pick-up detecting reflected or transmitted signals from the blocks corresponding to the optical characteristics based on the ink type and the breakage state of the blocks under the predetermined condition; and means for providing a first reference level for absence of the breakage in the block of the first ink type, a second reference level for presence of the breakage in the block of the first ink type, a third reference level for absence of the breakage in the block of the second ink type and a fourth reference level for presence of the breakage in the block of the second ink type, and obtaining, based on the four reference levels, a first information representing the pattern of ink types and a second information representing the breakage state of the blocks.

4. The system as claimed in claim 3 further comprising:

means for comparing the first, the second, the third and the fourth reference levels with the detected reflected or transmitted signals from the blocks, detecting, on the basis of result of the comparison, the type of ink provided in each of the blocks and collating whether or not the detected ink pattern coincides with the predetermined pattern.

* * * * *